SPEECH MODULATION SYSTEM UTILIZING TWO SPACED FREQUENCIES

Filed Oct. 20, 1960 3 Sheets-Sheet 1

INVENTOR
WILLIAM L. FIRESTONE
BY Mueller & Aichele
ATTYS.

INVENTOR
WILLIAM L. FIRESTONE
BY
Mueller & Aichele
ATTYS.

SPEECH MODULATION SYSTEM UTILIZING TWO SPACED FREQUENCIES

Filed Oct. 20, 1960

INVENTOR
WILLIAM L. FIRESTONE

BY Mueller & Aichele

ATTYS.

United States Patent Office 3,136,949
Patented June 9, 1964

3,136,949

SPEECH MODULATION SYSTEM UTILIZING TWO SPACED FREQUENCIES

William L. Firestone, Highland Park, Ill., assignor to Motorola, Inc., Chicago, Ill., a corporation of Illinois
Filed Oct. 20, 1960, Ser. No. 63,890
11 Claims. (Cl. 325—60)

This invention relates to signaling systems and means, and more particularly to improved modulating systems having oscillator circuits controlled by an audio modulating voltage to produce a characteristic carrier wave.

In frequency modulation systems intelligence is transmitted by varying the instantaneous frequency of the carrier wave in accordance with the signals to be modulated on the carrier wave while keeping the amplitude thereof constant. The intensity or amplitude of the modulation signals, such as speech or music, determines the amount of frequency change or swing of the carrier from its predetermined operating frequency, and is termed frequency deviation ($dF$). The frequency of the modulation signal determines the rate at which the instantaneous frequency varies. Today, the advantages of frequency modulation over amplitude modulation are known and well appreciated in the radio communication arts.

There are various known methods for varying the output frequency of a vacuum tube oscillator to obtain frequency modulation. However, regardless of which method is used, the predetermined operating frequency of the oscillator when producing the unmodulated carrier should always remain as constant as possible. In the present state of the art, the greatest accuracy in frequency stability of an oscillator is obtained when the frequency determining element is a vibratile device, such as a piezoelectric crystal. But since a crystal tends to hold the generated oscillations at a constant frequency, only a small deviation about the crystal frequency is obtainable for modulation purposes. Hence various attempts have been made in the prior art to provide transmission systems having a comparatively wide frequency deviation about a stable average frequency. Low frequency crystals followed by several frequency multiplier stages have been used but this is an expensive solution which is still limited by the low deviation characteristics of crystals and by the lowest frequency rating of the crystal. Other systems have been proposed which employ two or more crystal oscillators of different frequency which are either cross-coupled to mix or beat their outputs to obtain a wider deviation by additive effects, or are connected in a ring or push-pull system to double their individual deviation. The amount of deviation in these systems is still limited by the crystal itself and by the locking phenomena of coupled oscillators which sets rather narrow limits on the permissible separation between the crystal frequencies.

Accordingly, it is an object of the present invention to provide an improved system and means for communicating intelligence with a two frequency signal which may have a very large deviation range at either high and low frequencies, without having to start with a low deviation and then frequency multiply with the usual multiplier stages.

Another object is to provide a system of the above character which is crystal controlled but not dependent on the deviation characteristics of the crystals used therein.

A further object is to provide a system for communicating clipped speech intelligence by a hybrid frequency and amplitude modulation type carrier in which 100 percent depth of modulation can be obtained at all times.

Yet another object is to provide an improved system and transmitter therefor in which clipped speech signals are transmitted by a carrier wave receivable by either amplitude modulation or frequency modulation receiving systems.

A still further object is to provide a communication system in which voice intelligence is easily converted to a signal which may be transmitted and received by frequency shift equipment.

A feature of the invention is the provision of a system of communicating audio intelligence in which the signal is split into two separate modulating signals each of which controls an oscillator circuit to respectively produce oscillations at two predetermined frequencies which are transmitted as the signal.

Another feature is the provision of a transmitter modulation system employing oscillator means controlled by two separate crystals and which produces carrier signals at either of the two frequencies determined by these crystals in response to audio intelligence input signals.

A further feature is the provision of a transmitter having a clipped speech amplifier whose output is split into two separate modulating signals which are applied to circuit means operative to instantaneously switch the output of crystal controlled oscillator means between two predetermined frequencies which are transmitted as a single carrier receivable on frequency or amplitude modulation receiving system.

In the accompanying drawings:

FIG. 1 is a schematic diagram of a transmitter in accordance with the invention;

FIGS. 1(*a*), (*b*) and (*c*) are block diagrams of three types of receiving systems which may be used in the system of the invention;

The invention provides a method and means for communicating audio intelligence in essentially a two-channel amplitude modulation system. The method provides a similar output from audio signals which are used to alternately switch from a carrier of one predetermined fixed frequency to another carrier of a different predetermined fixed frequency to produce a hybrid AM–FM signal which can be detected by suitable amplitude or frequency modulation receiving systems.

In certain of the embodiments, clipped speech is utilized to modulate the carriers. The two carriers may be produced by one oscillator circuit controlled by two different crystals, with the positive and negative portions of the clipped speech signal each being operative to control one of the crystals. Hence two carriers are alternately produced which are combined to form a square wave frequency modulation signal for all levels of audio input. Alternatively, two oscillators, controlled by separate crystals or other frequency determining means, may be operated continuously to produce the two predetermined carrier frequencies. The clipped speech is phase inverted to obtain two gating signals to alternately control the output signal from each oscillator which when combined provide the hybrid signal. The phase split clipped speech signal may also be used to first cutoff one oscillator and then the other, again producing two carriers which are alternately turned on and off. An ultrasonic bias is provided to control the carriers whenever audio is not present to produce quieting action and to provide a tunable signal. In one embodiment the speech is not clipped except on extremely high audio signals. The two carriers are always present and are amplitude modulated by the respective split phase signals. The two frequencies are then combined in various proportions to provide a wide deviation two frequency signal receivable on suitable amplitude modulation receiving systems.

Figures 1, 1A, 1B, 1C:
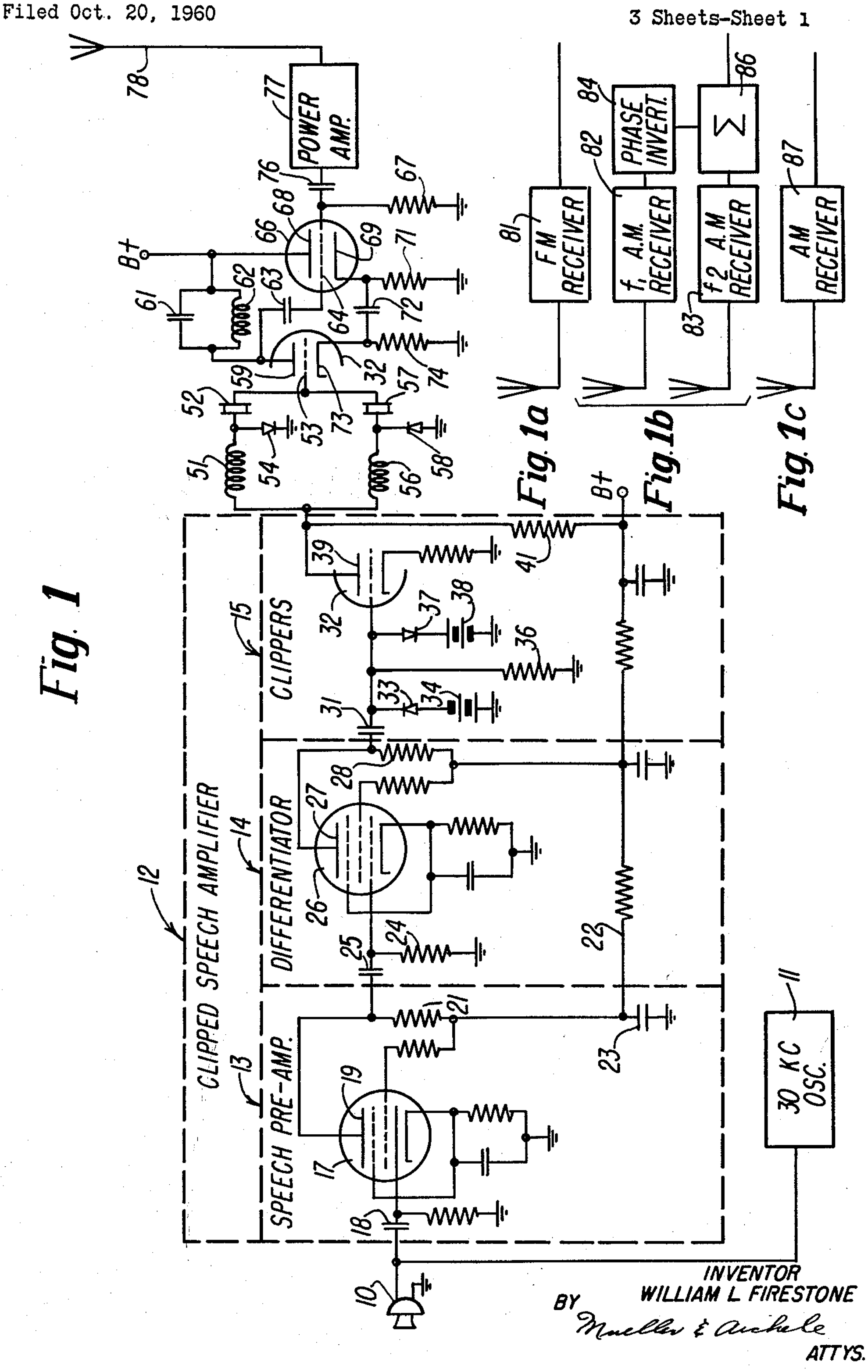

Referring in more detail to the accompanying drawings, FIG. 1 shows in schematic form a transmitter constructed in accordance with the invention having a two-crystal oscillator controlled by clipped speech signals. The transmitter includes a source of speech signals in the form of a microphone 10 and a source of ultra-sonic bias signals such as a 30 kilocycle oscillator 11, with both sources being coupled to the input circuit of a clipped speech amplifier 12. The clipped speech amplifier includes three sections; a speech pre-amplifier 13, a differentiator section 14 and a clipper section 15.

Speech pre-amplifier 13 includes a class A amplifying tube 17, the grid of which is coupled to the input signals by means of coupling capacitor 18. The output circuit of tube 17 includes a plate 19 thereof in series with a plate load resistor 21 connected to a common B+ lead 22, with a bypass capacitor 23 connected between lead 22 and the reference potential or ground for decoupling the output from the next section.

Differentiator section 14 includes a coupling capacitor 25 connected in series with a resistor 24 between the output of the speech pre-amplifier and ground, which together form an RC network for differentiating the output of the speech pre-amplifier. The junction of capacitor 25 and resistor 24 is connected to the grid of amplifying tube 26. Differentiated and amplified signals are developed across a plate load resistor 28 connected to the plate 27 of tube 26.

Signals from the differentiator section are coupled to the clipper section 15 by means of a coupling capacitor 31 connected to the grid of one triode section of a double triode tube 32. These signals are first modified by a wave shaping or clipping network which includes a rectifying diode 33 in series with a biasing potential source such as battery 34, a grid return resistor 36 and another rectifying diode 37 in series with another battery 38, all connected in shunt between the junction of capacitor 31 with the grid of tube 32 and the refeernce potential. The diodes and their respective biasing cells are oppositely poled with respect to each other to clip signal peaks of opposite polarity. Amplified square wave signals are developed across a plate load resistor 41 connected between a plate 39 and the B+ lead.

In the operation of the clipped speech amplifier 12 it will be understood that it serves to translate speech intelligence into amplified square wave signals, the positive and negative portions of which are of substantially constant amplitude but whose duration is proportional to the amplitude of the audio input signal. The theory of clipped speech communication and means for accomplishing the same are well known in the art and therefore not discussed in detail herein.

The output from the clipped speech amplifier is connected to a crystal input network of the transmitter. One parallel branch of this network includes a radio frequency choke 51 in series with a piezoelectric crystal 52 connected to a grid 53 of the other triode section of double triode 32. The junction of choke 51 with crystal 52 is grounded for signals of one polarity by switching diode 54. The other branch of the oscillator input circuit also includes a radio frequency choke 56 in series with a piezoelectric crystal 57 connected to grid 53, with the input to the crystal being shunted to ground for signals of the opposite polarity by means of a switching diode 58.

The right half of double triode 32 is connected to function as an oscillator, plate 59 thereof being connected to a tank circuit consisting of capacitor 61 and inductor 62 connected in parallel to a source of B+ voltage and serving as a tuned plate load for the oscillator. Plate 59 is also coupled through a capacitor 63 to the grid 64 of a triode vacuum tube 66 and thence to a load resistor 67 connected to ground. The plate 68 of triode 66 is connected directly to the source of B+ potential and the cathode 69 of tube 66 is connected to ground through a cathode biasing resistor 71. Cathode 69 is coupled by a capacitor 72 to the junction of cathode 73 of double triode 32 with a cathode biasing resistor 74. Output signals appearing across resistor 67 are coupled by a blocking capacitor 76 to the power amplifier 77 of the transmitter to be amplified therein and then applied to antenna 78 for radiation.

The transmitter of FIG. 1 operates to produce a wide deviation FM type communication signal from speech signals received by microphone 10. The clipped speech amplifier 12 generally described above provides a square wave output across resistor 41 in accordance with the audio frequency speech signals. The clipped speech is produced by amplifying audio signals in speech preamplifier 13, passing these through the six decibel per octave differentiator 14 and then "infinitely" clipping them in the clipper section 15 to produce a series of rectangular waves which represent the input speech signal.

The bias oscillator 11 provides a sinusoidal signal at a frequency above the audio frequency range, such as 30 kilocycles per second, which serves as a carrier frequency which is overridden or modulated by the audio input signal from microphone 10. That is, the relative amplitudes of the two signals are such that during reception of speech signals the bias signal will be blocked from the input of the clipped speech amplifier, but whenever audio is not present the steady 30 kilocycle signal is amplified and clipped to provide a corresponding square wave output in place of the clipped speech output. This ultra-sonic bias therefore produces quieting action to overcome the amplification of noise in the speech clipper which would otherwise occur whenever audio is not present.

The audio frequency square wave output of the clipped speech amplifier is applied across the radio frequency chokes 51 and 56 to oscillator crystals 52 and 57 respectively. Crystals 52 and 57 are selected to drive the oscillator at given frequencies $F_1$ and $F_2$ respectively whenever a given potential is applied across the respective crystals. The difference between these two frequencies, $dF$, is determined by the desired deviation, $dF/2$, in the output signal of the transmitter. Diodes 54 and 58 are oppositely poled to function as switching diodes with respect to the crystals. Thus, positive going portions of the clipped speech output signal are applied just to crystal 52 since the input side of crystal 57 is grounded for these signals by diode 58, while for negative portions of the square wave signal the opposite is true, diode 54 being turned on by such signals while diode 58 remains off. Hence the diodes are switched at an audio rate corresponding to the clipped speech output so that one or the other of the crystals is oscillating in accordance therewith.

Triode 66 serves as a regenerative device for the two frequency oscillator section of double triode 32. Since its grid is controlled by the output signal of the oscillator, the signals developed across resistor 71 rapidly follow the frequency of the output and will be correctly phased to supply regenerative signals to cathode 73 of the oscillator.

Since the crystals control the frequency of the oscillator, it is driven at either $F_1$ or $F_2$, with one hundred percent deviation under all modulating conditions. The signal thus produced by the oscillator may be termed a hybrid AM-FM signal, with communication intelligence being transmitted on two intermittently appearing carrier frequencies as determined by the clipped speech and being slightly amplitude modulated in accordance therewith. This transmitted signal is essentially a square wave frequency modulation signal which is produced for all levels of audio input and which can be detected by a frequency modulation receiver. The two carrier frequencies $F_1$ and $F_2$ are determined directly by crystals 52 and 57, which crystals may be selected to operate at their highest oscillating frequency to produce these frequencies. Almost any degree of deviation at any crystal oscillating frequency is possible, depending upon the values selected. For example, in a transmitter constructed in accordance with FIG. 1, $dF$ was about 15 kilocycles for high frequency crystals of about 30 megacycles or above. Thus the oscillator of the invention produces direct FM at a high frequency without requiring the use of frequency multiplier stages or a tube modulator. Due to the provision of the ultra-sonic bias the two carriers are alternately produced under no-signal conditions at a 30 kilocycle rate which permits tuning in on the average carrier frequency.

The intelligence radiated from the transmitter antenna 78 is receivable by any of at least three types of receiving systems as illustrated in FIGS. 1(*a*), 1(*b*) and 1(*c*). In FIG. 1(*a*) a frequency modulation receiver 81, shown in block form, is adapted to receive and translate square wave FM signals from the clipped speech transmitter into speech signals in the manner of known FM clipped speech receivers. The signals produced by the transmitter of FIG. 1 may also be received on the double amplitude modulation receiver system of FIG. 1(*b*). Here, an amplitude modulation receiver 82 is narrowly tuned to frequency $F_1$ while a second amplitude modulation receiver 83 is narrowly tuned to receive frequency $F_2$. A phase inverter 84 is coupled to the output of receiver 82 to match the phase of the output thereof with the output of receiver 83, and then the respective outputs are summed in a signal adder 86 to produce the audio intelligence. A third alternative receiving system is shown in FIG. 1(*c*) wherein an amplitude modulation receiver 87 is provided which is tuned in such a manner as to receive both frequencies $F_1$ and $F_2$ in an unequal proportion and to translate the signals in a manner well known in the art.

Figure 2:
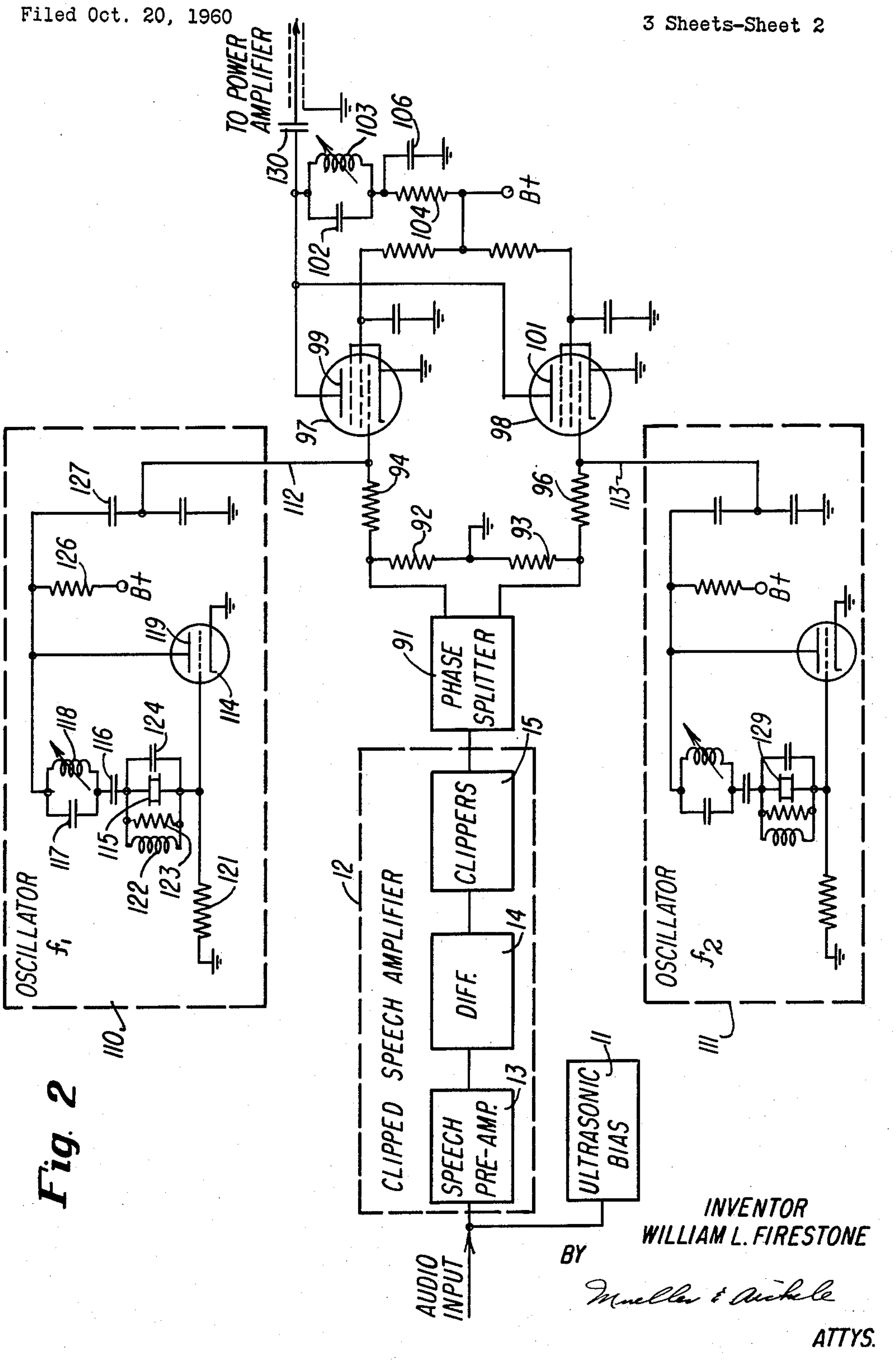
FIG. 2 is a schematic diagram of a portion of a modified transmitter in accordance with the invention.

A modified transmitter system in accordance with the invention is shown in schematic form in FIG. 2. This system uses the clipped speech amplifier 12 of FIG. 1 which, as previously described, is provided with audio input signals which override the ultra-sonic bias signals from source 11. The clipped speech output from clipper section 15 of amplifier 12 is applied to a suitable phase splitter 91. The phase splitter provides two clipped speech signals balanced to ground and 180° out of phase which are respectively developed over the grid biasing resistors 92 and 93 connected between the phase splitter output terminals and ground. These signals are applied to the grids of a pair of gating tubes 97 and 98 respectively through the blocking resistors 94 and 96 connected thereto. Tubes 97 and 98 are pentode amplifying tubes which are controlled by gate pulses consisting of the two clipped speech signals split in phase, with the pulses operative to first cut off one tube and then the other and thus disable the tubes with respect to the phenomena to be passed through the tubes. The respective plates 99 and 101 of tubes 97 and 98 are connected in common to a tunable tank circuit including a capacitor 102 and a variable inductor 103 in series with a load resistor 104 connected to a source of B+ potential. Capacitor 106 is connected between the junction of resistor 104 and the tank to by-pass radio frequency signals to ground.

The phenomena to be gated are the output signals from a pair of oscillators 110 and 111 which are respectively connected to the control grids of tubes 97 and 98 by leads 112 and 113. Oscillator 110 includes a triode tube 114 with a grounded cathode. The grid of tube 114 is controlled by a piezoelectric crystal 115 coupled by a capacitor 116 to a tunable tank circuit including capacitor 117 in parallel with a variable inductor 118, which in turn is connected to a plate 119 of tube 114. A grid biasing resistor 121 is also connected to the grid of tube 114, and an inductor 122, a resistor 123 and a capacitor 124 are connected in shunt with crystal 118. Triode 114 oscillates continuously at a frequency determined by crystal 115 to produce signals having a frequency $F_1$, which signals are developed over a plate load resistor 126 connected to a source of B+ potential. The signals are applied to the grid of gating tube 97 by means of a coupling capacitor 127 connected between plate 119 and lead 112. Oscillator 111 is identically arranged but includes a piezoelectric crystal 129 of the proper value to control the oscillator so that it generates output signals at a frequency of $F_2$, with these signals being applied to the grid of gating tube 98 through lead 113.

Since the output from the phase splitter consists of two clipped speech signals 180° out of phase and of sufficient amplitude to cut off the respective plates of the gating tubes, the tubes will be disabled in accordance with the phase relationship of the output signals. Their common output signal thus consists of two carriers at frequency $F_1$ and $F_2$ which are alternately turned on and off. This two channel output is fed through coupling capacitor 130 to the power amplifying sections of the transmitter for radiation by the antenna thereof in accordance with the system of the invention. Reception of the signals is effected by any of the receiver systems as described in connection with FIGS. 1(*a*), 1(*b*) and 1(*c*).

Figure 3:
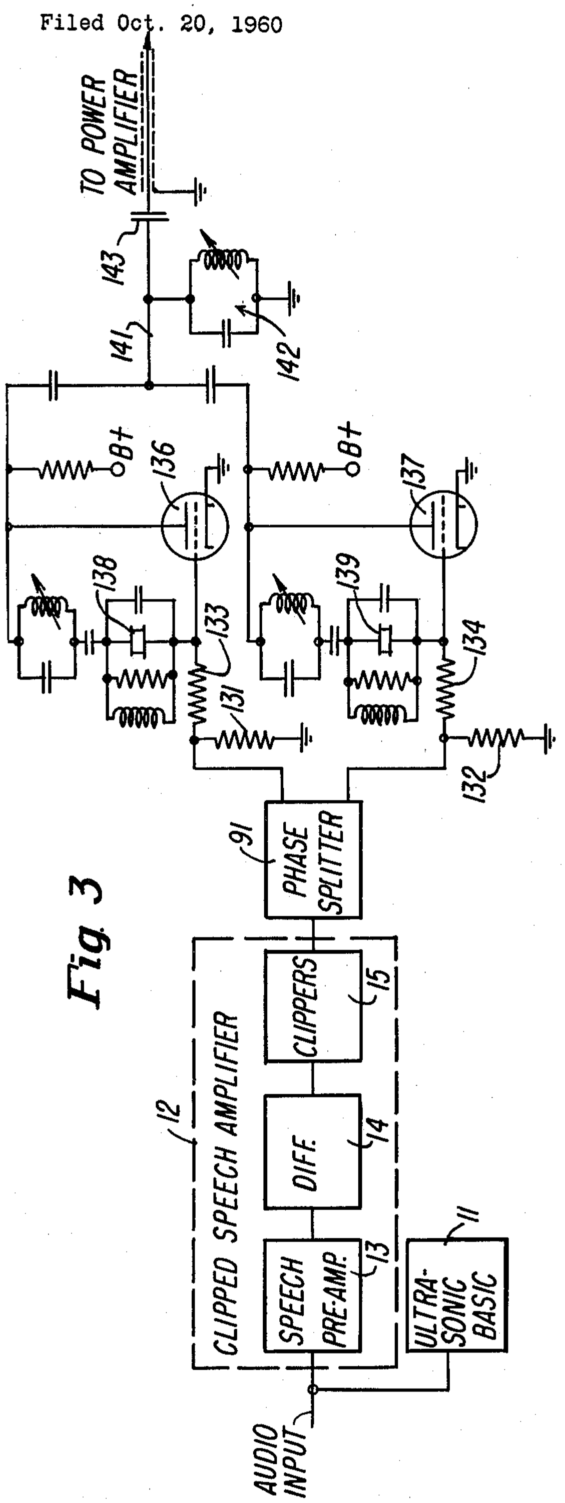
FIG. 3 is a schematic diagram of a portion of another form of transmitter in accordance with the invention.

FIG. 3 illustrates another form of a clipped speech transmitter in accordance with the invention. Here again the clipped speech amplifier 12 described in connection with FIG. 1 is employed with an ultra-sonic bias source 11 to provide a square wave output in accordance with clipped speech operation, and this signal is applied to the phase splitter 91 as in the system of FIG. 2. However, instead of the output from the phase splitter controlling alternately a pair of gating tubes, the clipped speech from the phase splitter is directly employed to alternately switch a pair of oscillators. The output from phase splitter 91 is developed across a pair of grid biasing resistors 131 and 132 which are respectively coupled by grid resistors 133 and 134 to the grids of triodes 136 and 137. Oscillations of oscillator tube 136 are controlled by the piezoelectric crystal 138 while oscillations of oscillator tube 137 are controlled by the crystal 139. These crystals again are selected to have the correct values to produce oscillation frequencies of $F_1$ and $F_2$ respectively. As in the system of FIG. 2, the oscillators operate continuously when no modulation is present, switching back and forth at the rate of the ultra-sonic bias. When the clipped speech modulation is present, the output from the phase splitter 91 first cuts off one oscillator so that the other oscillator alone is generating its frequency, and then the other oscillator is cut off and the first one generates its frequency. Hence, a two channel output similar in form to that produced by the systems of FIGS. 1 and 2 will be produced in the common output lead 141. A tunable filter circuit 142, connected between lead 141 and ground, provides an impedance for the output signals, and a capacitor 143 couples the two channel signal to the power amplifier sections of the transmitter for radiation from the antenna thereof.

Figure 4:
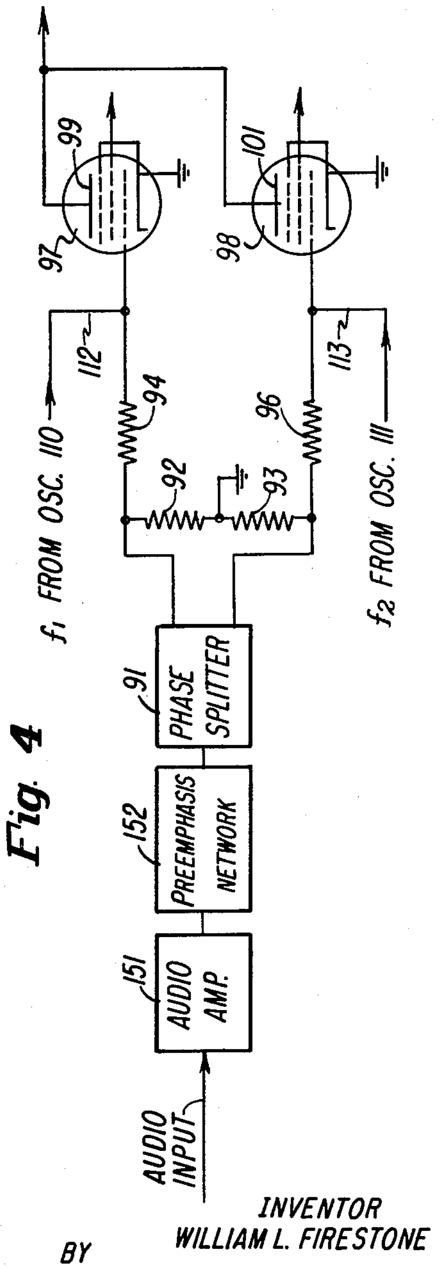
FIG. 4 is a schematic diagram of a modified input section for amplitude modulating the transmitter of FIG. 2 further in accordance with the invention.

FIG. 4 shows a modified transmitter amplifying and modulating system for use with the oscillators of FIG. 2. In this system the output signals from the two oscillators 110 and 111 are modulated by ordinary speech intelligence rather than by clipped speech. Audio input signals are supplied to an audio amplifier stage 151 designed to operate class A since in this system the speech is not clipped except on extremely high audio signals. The output from amplifier 151 is applied to a preemphasis network 152 which develops an output voltage that is proportional to the rate of change of the voltage applied from the preceding stage. The preemphasized signals are then applied to phase splitter 91 so that signals of one phase are developed across the biasing resistor 92 and those of the opposite phase developed biasing resistor 93. However, the value of these signals is such with respect to the characteristic of tubes 97 and 98 that a modulating bias rather than a gate pulse is applied to these tubes. This results in both carrier frequencies $F_1$ and $F_2$, generated by the oscillators 110 and 111 respectively, being continuously present in the common output lead connected to the plates 99 and 101.

The system of FIG. 4 therefore is essentially an amplitude modulation system with the two carriers amplitude modulated 180° out of phase and existing simultaneously. Both $F_1$ and $F_2$ always occur and are actually mixed in a certain proportion to yield an average frequency $F_0$ plus or minus modulation. However $F_0$ never actually exists as a single frequency; instead dynamic oscillation of both frequencies occurs simultaneously. As in the other systems described above, the two frequencies may be arbitrarily far apart, and the two oscillators are not coupled in any way. As a result, almost any amount of deviation at any crystal frequency is possible in this system as well as in any other systems. It is to be noted that the system of FIG. 4 does not require an ultra-sonic bias since the noise is not "infinitely" amplified and is low when no modulation is present. Also, this system requires less audio gain than the previous systems and of course does not have the characteristics of clipped speech. The tubes 97 and 98 are selected to mix linearly in the operating range since this system depends upon the summation in various proportions of the two frequencies, as contrasted with the practically instantaneous switching between the gating tubes as operated in the system of FIG. 2. The intelligence transmitted by a transmitter so modulated is receivable on either the double AM receiver system of FIG. 1(*b*) or the FM receiver of FIG. 1(*a*). Such an FM receiver however should not have perfect limiting. However, due to the fact that the modulation envelopes are 180° out of phase the signal cannot be received on the AM receiver of FIG. 1(*c*). Putting it another way, the transmitter output does not vary in amplitude.

I claim:

1. In a signaling system the combination including, a source of speech signals, speech signal translating means including differentiating means coupled to said speech signal source for producing first and second modulating signals from said intelligence, oscillator circuit means adapted to produce first and second frequencies at a common output point thereof, control circuit means coupling said translating means to said oscillator circuit means so that said first and second frequencies are respectively controlled in accordance with said first and second modulating signals, and output circuit means coupled to the common output of said oscillator circuit means for transmitting the resultant signal including said first and second frequencies.

2. A method of signaling including the steps of, providing speech signals of predetermined amplitude, differentiating said speech signals to increase the peak to overage ratio thereof, infinitely clipping said differentiated signals to provide a series of rectangular waves having portions of positive and negative polarity and representative of said speech signal, generating two separate carrier waves of predetermined frequencies $F_1$ and $F_2$ respectively with said frequency $F_1$ being generated in response to the positive portions of said signal and frequency $F_2$ in response to the negative portions of said signal, and transmitting the two frequencies as a synthetic frequency modulation signal.

3. A transmitter for communicating speech intelligence including in combination, a source of speech signals, a source of ultra-sonic bias signals, a clipped speech amplifier coupled to said sources of speech and ultrasonic bias signals for producing infinitely clipped square wave output signals from said speech and bias signals, an oscillator having first and second crystals connected thereto for establishing two oscillator frequencies $F_1$ and $F_2$, switching means coupling the output signals from said clipped speech amplifier to said crystals with the positive and negative portions of said signals respectively controlling said first and second crystals to produce an oscillator output signal instantaneously switched between frequencies $F_1$ and $F_2$ in accordance with said clipped speech signals, and means coupled to the output of said oscillator for amplifying and transmitting said oscillator output signal including frequencies $F_1$ and $F_2$.

4. A method of signaling including the steps of, providing speech signals of predetermined amplitude, differentiating said signals to increase the peak to average ratio thereof, infinitely clipping said differentiated signals to produce a series of rectangular waves representative of the speech signals, splitting the clipped signals into first and second gating signals of equal amplitude but of opposite phase, providing continuous oscillations at frequencies $F_1$ and $F_2$ respectively, gating and amplifying the oscillations of frequency $F_1$ in accordance with the amplitude of said first gating signal, gating and amplifying the oscillations of frequency $F_2$ in accordance with the amplitude of said second gating signal, and transmitting said oscillations at frequencies $F_1$ and $F_2$.

5. A transmitter for speech communication including in combination, a source of speech signals, a clipped speech amplifier coupled to said source of speech signals for differentiating said signals to increase the peak to average ratio thereof and for infinitely clipping said differentiated signals to produce a series of rectangular waves representative of the speech signals, phase translating means coupled to said amplifier for splitting the clipped signals into first and second gating signals of equal amplitude but of opposite phase and balanced with respect to a reference point, first and second oscillator means providing continuous oscillations at frequencies $F_1$ and $F_2$ respectively, a first gating tube circuit coupled to said first oscillator means for amplifying the oscillations of frequency $F_1$, a second gating tube circuit coupled to said second oscillator means for amplifying the oscillations of frequency $F_2$, bias circuit means coupling said first and second gating signals from said phase translating means to said first and second gating tube circuits respectively for disabling said circuits in accordance with the respective amplitudes of said gating signals, and means coupled to said first and second gating tube circuits for transmitting the oscillations at the output of said gating tube circuits.

6. A method of signaling including the steps of, providing speech signals of predetermined amplitude, differentiating said speech signals to increase the peak to average ratio thereof, infinitely clipping said differentiated signals to provide a series of rectangular waves representative of said speech signal, splitting the clipped signals into first and second cut off biasing signals identical in form but of opposite phase, providing two separate and continuously generated carrier waves of predetermined frequencies $F_1$ and $F_2$ respectively, alternately cutting off one of said two frequencies in accordance with the respective amplitudes of said first and second biasing signals, and transmitting the two frequencies so modified.

7. A transmitter for communicating speech intelligence including in combination, a source of speech signals, a source of ultra-sonic bias signals, a clipped speech amplifier coupled to said sources of speech and ultrasonic bias signals for producing infinitely clipped square wave output signals from said speech and bias signals, phase splitting means coupled to said amplifier for translating said square wave output signals into identical first and second signals 180° out of phase with one another, first and second oscillators for establishing separate oscillator frequencies $F_1$ and $F_2$ respectively, bias circuit means coupling said first and second signals from said phase splitting means to said first and second oscillators respectively with the positive portions of said signals respectively controlling said first and second oscillators, and means coupled to both of said oscillators for amplifying and transmitting said oscillator output signals.

8. A method of signaling which includes the steps of, providing audio intelligence of predetermined amplitude, differentiating the intelligence to increase the peak to average ratio thereof, splitting the intelligence signal into first and second modulating signals identical in form but of opposite phase, providing two separate and continuously generated carrier waves of predetermined frequencies $F_1$ and $F_2$ respectively, varying the amplitude of the carrier wave of frequency $F_1$ in accordance with amplitude variations of the first modulating signals, varying the amplitude of the carrier wave of frequency $F_2$ in accordance with amplitude variations of the second modulating signal, and transmitting the two modulated carrier waves.

9. In a speech communicating system the combination including, a source of audio frequency signals, amplifier means coupled to said source of audio frequency signals for amplifying said signals, phase translating means coupled to said amplifier means for splitting the output signals thereof into first and second biasing signals of equal amplitude but of opposite phase, first and second oscillator means providing continuous oscillations at frequencies $F_1$ and $F_2$ respectively, a first amplifying circuit coupled to said first oscillator means for amplifying the oscillations of frequency $F_1$, a second amplifying circuit coupled to said second oscillator means for amplifying the oscillations of frequency $F_2$, bias circuit means coupled between said phase translating means and said first and second amplifying circuits for coupling said first and second biasing signals respectively to said first and second amplifying circuits to control the gain of said circuits in accordance therewith, and means coupled to said first and second amplifying circuits for transmitting the respective amplified oscillations therefrom.

10. A method of signaling which includes the steps of, providing speech signals to be communicated, differentiating said speech signals to increase the peak to average ratio thereof, translating said differentiated speech signals into first and second separate control signals having a one hundred eighty degree phase relation, controlling the amplitude of a first carrier wave at a predetermined frequency $F_1$ in accordance with amplitude variations of said first control signal, controlling the amplitude of a second carrier wave at a frequency $F_2$ having a fixed frequency relation to said frequency $F_1$ in accordance with amplitude variations of said second control signal, and transmitting said first and second carrier waves as thus controlled.

11. A method of signaling which includes the steps of, providing speech signals to be communicated, differentiating said speech signals to increase the peak to average ratio thereof, infinitely clipping said differentiated signals to provide a series of rectangular waves representing said speech signals, translating said rectangular waves into first and second separate control signals having a one hundred eighty degree phase relation, controlling a first carrier wave at a predetermined frequency $F_1$ in accordance with said first control signal, controlling a second carrier wave at a second different predetermined frequency $F_2$ in accordance with said second control signal, and transmitting said first and second carrier waves as thus controlled.

References Cited in the file of this patent

UNITED STATES PATENTS

| | | |
|---|---|---|
| 2,458,760 | Andersen | Jan. 11, 1949 |
| 2,461,456 | Usselman | Feb. 8, 1949 |
| 2,480,338 | Purington | Aug. 30, 1949 |
| 2,482,561 | Shenk | Sept. 20, 1949 |
| 2,494,321 | Usselman | Jan. 10, 1950 |
| 2,683,252 | Gordon | July 6, 1954 |